United States Patent [19]

Mulholland et al.

[11] Patent Number: 5,127,073
[45] Date of Patent: Jun. 30, 1992

[54] ACTIVE DEVICE MOUNT WITH PUSH-PULL OPTICAL FIBER CONNECTOR RECEPTACLE

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 558,976

[22] Filed: Jul. 27, 1990

Related U.S. Application Data

[63] Continuation-in-part of Ser. No. 541,675, Jun. 21, 1990, Pat. No. 5,042,891.

[51] Int. Cl.⁵ .............................................. G02B 6/42
[52] U.S. Cl. ........................................ 385/92; 385/88
[58] Field of Search ................. 350/96.2, 96.15, 96.18; 357/30, 72, 74; 385/88, 92, 93, 94

[56] References Cited

U.S. PATENT DOCUMENTS 4,186,995 2/1980 Schumacher ...................... 350/96.2
4,461,537 7/1984 Raymer, II et al. ................ 350/96.2

*Primary Examiner*—John D. Lee
*Assistant Examiner*—John Ngo
*Attorney, Agent, or Firm*—Gerald K. Kita

[57] ABSTRACT

An active device mount 1 comprises a base 2 having a forward face with a connecting means 3 for attaching an optical fiber connector. The connector has an alignment ferrule and an optical fiber extending therethrough. The mount 1 has a rearward face with securing means 4 for an active device. The connecting means 3 comprises a front socket 17 extending therefrom the active device mount base 2 and has a longitudinal axis and axial bore 18. The connecting means 3 further comprises at least two resilient catch pieces 20 of cantilever form extending from the base 2 parallel to and on opposing sides of the longitudinal axis of the front socket 17. The resilient catch pieces 20 terminate in protrusions 22 and lip structures 23. The securing means 4 of the active device mount base 2 comprises a resilient, four sided, rhombic-shaped structure extending from the base 2 and encompassing the can 8 of the active device. The structure 4 secures the can 8 by press fit at four contact points 16 between the four inner surfaces 15 of the sides of the structure 4 and the surface of the can 8.

9 Claims, 4 Drawing Sheets

ACTIVE DEVICE MOUNT WITH PUSH-PULL OPTICAL FIBER CONNECTOR RECEPTACLE

FIELD OF THE INVENTION

This application is a continuation-in-part of Schaffer et al., U.S. patent application Ser. No. 07/541,675 filed Jun. 21, 1990, now U.S. Pat. No. 5,042,891, which disclosure is incorporated herein by reference. The present invention relates to an active device mount with resilient rhombic structure for providing press fit connection of the can of an active device. Particularly, the present invention relates to an active device mount that permits disconnect connection to a push-pull coupling type of optical fiber connector.

BACKGROUND OF THE INVENTION

Warner et al, identified above, discloses an active device mount assembly comprising an active device base and an active device mounted thereto and interface mount for attaching a fiber optic connector, the connector having an alignment ferrule and optical fiber extending therethrough. The interface mount comprises a base with the front socket extending therefrom. The base has a longitudinal axis and an axial bore. Further, the interface mount includes at least two resilient catch pieces extending from the base. The catch pieces are in cantilever form extending parallel to and on opposing sides of the longitudinal axis of the front socket. The catch pieces terminate in protrusions and lip structures.

While Schaffer et al. teaches an active device mount (ADM) secured within a housing and combined with an interface mount for connection to push-pull type of fiber optic connectors, by the present invention, is provided a mount which itself is modified for connection to push-pull type of fiber optic connectors.

Push-pull connectors are known, such as that disclosed by Umeki et al, Japanese Showa 60-218932. This connector includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

The present invention relates to an ADM for disconnect connection of an active device to an optical fiber of the push-pull coupling type of connector such as disclosed by Umeki et al, Japanese Showa 60-218932; Iwasa et al, Japanese Showa 62-26141; Kaihara et al, U.S. Pat. No. 4,762,389; and Myers et al, U.S. Pat. No. 4,872,736. Particularly, the invention relates to an ADM for the push-pull coupling type of connector disclosed by Mulholland et al, U.S. patent application Ser. No. 491,755, filed Mar. 9, 1990 still pending.

With ADM assemblies, optical emission from, for example a diode, or an optical signal to a detector, as the case may be, is transmitted successively through different transparent materials having different indices of optical refraction. A difficulty associated with conventional connector assemblies is that the light signal is scattered at the boundary between transparent materials of different indices Another difficulty is that the light signal may reflect from surfaces of the materials or from a junction of one of the materials with an air gap. Particularly, if the active device is a laser diode, and the emission is reflected backward at low angles of incidence to the reflecting surface, such backward reflection can enter the laser diode and cause instability.

An advantage of the present invention resides in an ADM with a resilient rhombic structure that permits simple press fit of the active device into the mount with resulting fit that addresses the stringent requirements of mounting and connecting active devices. Particularly, the present invention is an ADM which may be mounted in a variety of orientations on the surface of a housing. Finally, the ADM of the present invention permits connection to optical fiber connectors of the push-pull type. The present invention provides a disconnect coupling for a push-pull coupling type optical fiber connector to an active device with the same accuracy of alignment as the coupling of an optical fiber to an optical fiber while eliminating backward reflection and unnecessary loss.

SUMMARY OF THE INVENTION

The present invention relates to an active device mount comprising a base having a forward face with a connecting means for attaching an optical fiber connector. The connector has an alignment ferrule and an optical fiber extending therethrough. The mount has a rearward face with securing means for an active device. The connecting means comprises a front socket extending therefrom the active device mount base and having a longitudinal axis and axial bore. The connecting means further comprises at least two resilient catch pieces of cantilever form extending from the base parallel to and on opposing sides of the longitudinal axis of the front socket. The resilient catch pieces terminate in protrusions and lip structures. The active device securing means comprises a resilient, four sided, rhombic-shaped structure extending from the base and encompassing the can of an active device. The structure secures the can by press fit at four contact points between the four inner surfaces of the sides of the structure and the surface of the can.

The active device mount further may include an optical focusing element encompassed within the axial bore of the socket. The longitudinal axis of the focusing element will be aligned with the longitudinal axis of the axial bore of the socket. Further, the active device mount assembly may include a coupler element aligned with the focusing element and inserted to a precise depth into the socket of the assembly mount. Further, the coupler element may abut the alignment ferrule of the fiber optic connector with the optical fiber aligned to the center axis of the coupler element. The connecting means further includes an alignment sleeve encompassed by the front socket of the assembly mount. The longitudinal axis of the alignment sleeve extends parallel to the longitudinal axis of the socket. The two resilient catch pieces extend from the base and have cantilever arms. The cantilever arms extend parallel to and on opposing sides of the longitudinal axis of the alignment sleeves.

The ADM, in one embodiment, is for attaching an active device to a optical fiber connector where the connector comprises an optical fiber plug assembly. The plug assembly includes a plug housing with spacing through its body at a surface of a forward section. The plug assembly has defined exterior profile at a rearward section. A connector assembly is accommodated by and substantially within the plug housing. The connector assembly has, disposed at one exterior surface thereof, ridge, slot and tab. The ridge, slot tab are exposed through spacing at the surface of the forward section of the plug housing. Further included is a ferrule for fixing an optical fiber on a center axis thereof and accommodated within the connector assembly.

With this later embodiment, the optical fiber connector attaches to the ADM by insertion of the plug assembly into the connecting means so that each beveled leading edge face of the assembly contacts a respective leading edge of each lip of each resilient catch piece. This causes the catch piece to rise along the bevel of each face, over each ridge and to seat within each of the slots of the front shell portion, with the alignment ferrule of the fiber optic connector received within the alignment sleeve of the attaching means. This permits precise end face to end face alignment of the optical fiber of the fiber optic connector to the coupler element of the active device mount assembly within the socket of the interface mount.

BRIEF DESCRIPTION OF THE DRAWINGS

Some various embodiments of the ADM 1 of the present invention are shown in the drawings FIGS. 1, 2 and 3 show the ADM 1 horizontally disposed from the PCB, while FIGS. 4 and 5 show the ADM 1 disposed vertically from the PCB. FIGS. 6 and 7 show a vertically disposed ADM 1, additionally in combination with a receptacle housing 28.

DESCRIPTION OF A PREFERRED EMBODIMENT

Figure 1:
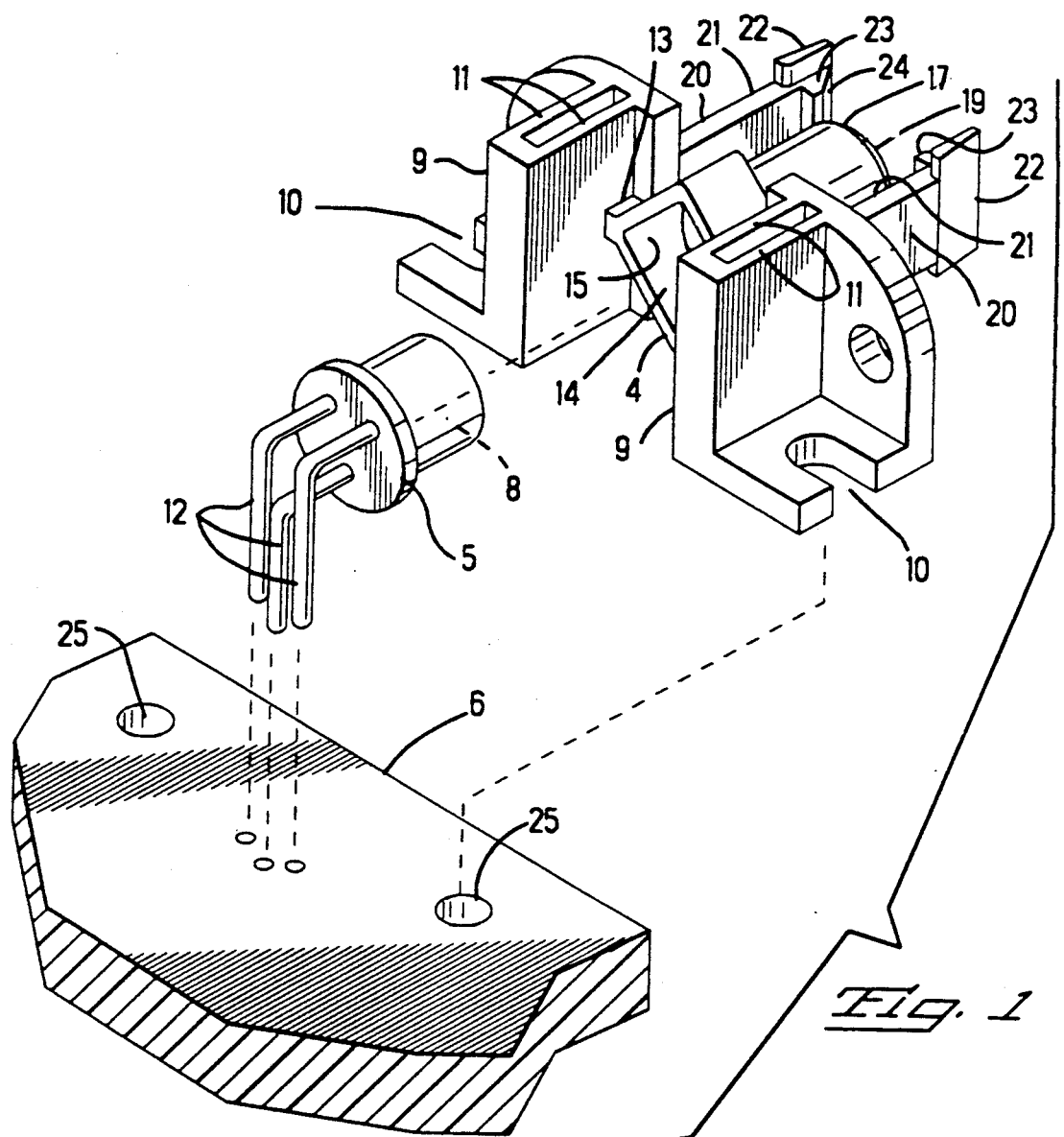
FIG. 1 is a perspective view, partially exploded, of a preferred embodiment of the ADM of the present invention, showing mounting to a printed circuit board (PCB) with the connecting means of the ADM disposed horizontally from the cover.
Figure 3:
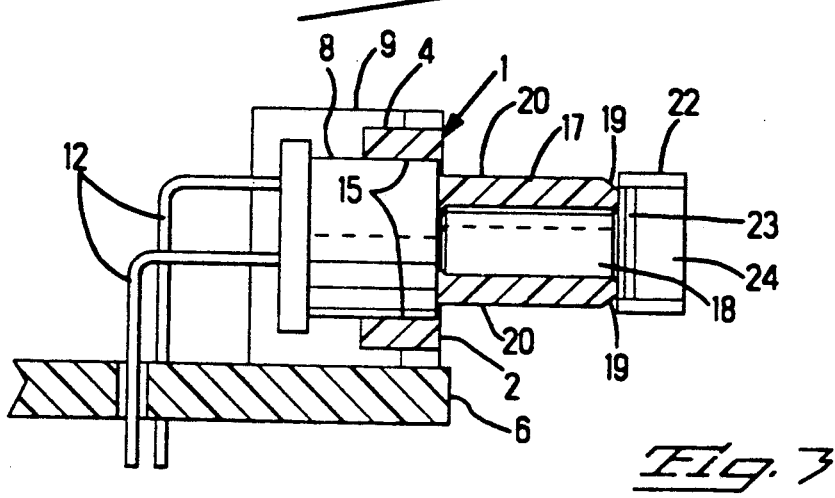
FIG. 3 is a side sectional view through sight line 3—3 of FIG. 2.
Figure 2:
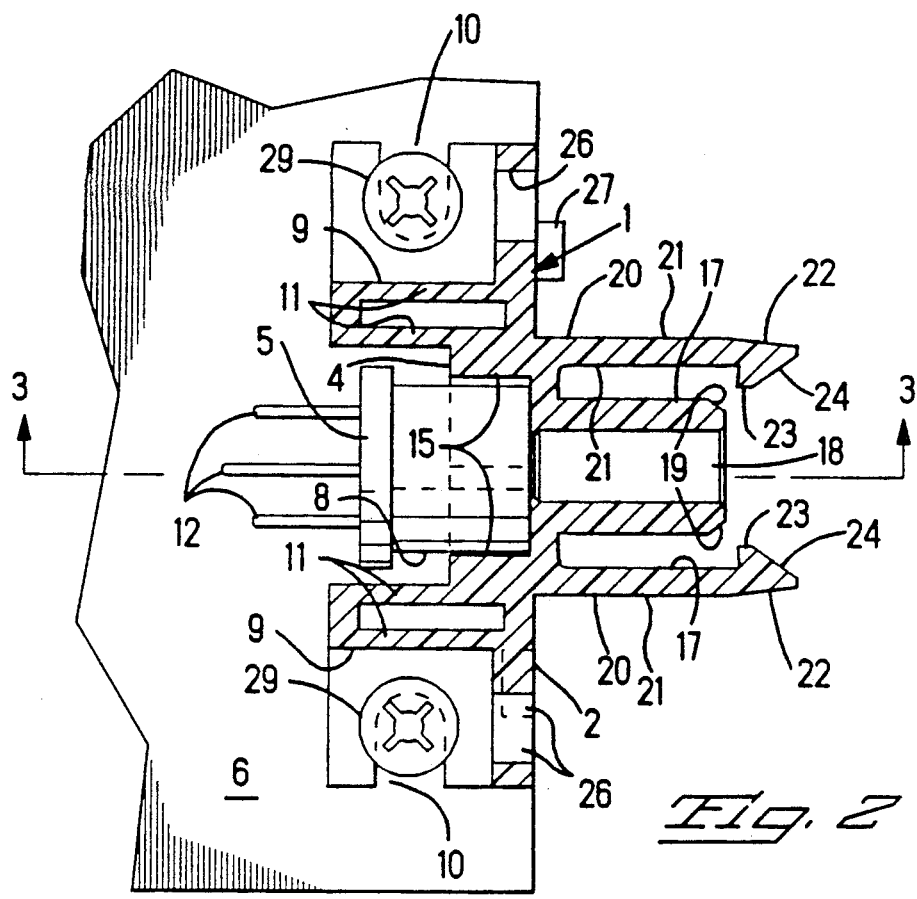
FIG. 2 is a top view, in section, of the ADM and PCB of FIG. 1
Figure 5:
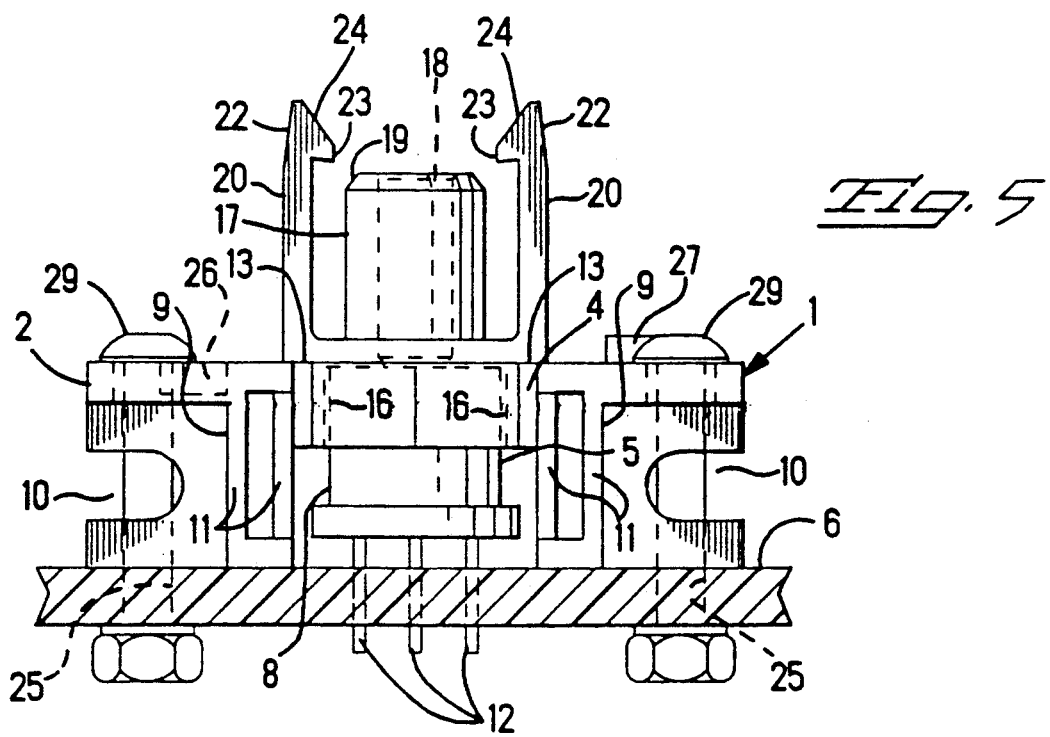
FIG. 5 is a side sectional view of the ADM of FIG. 4.
Figure 4:
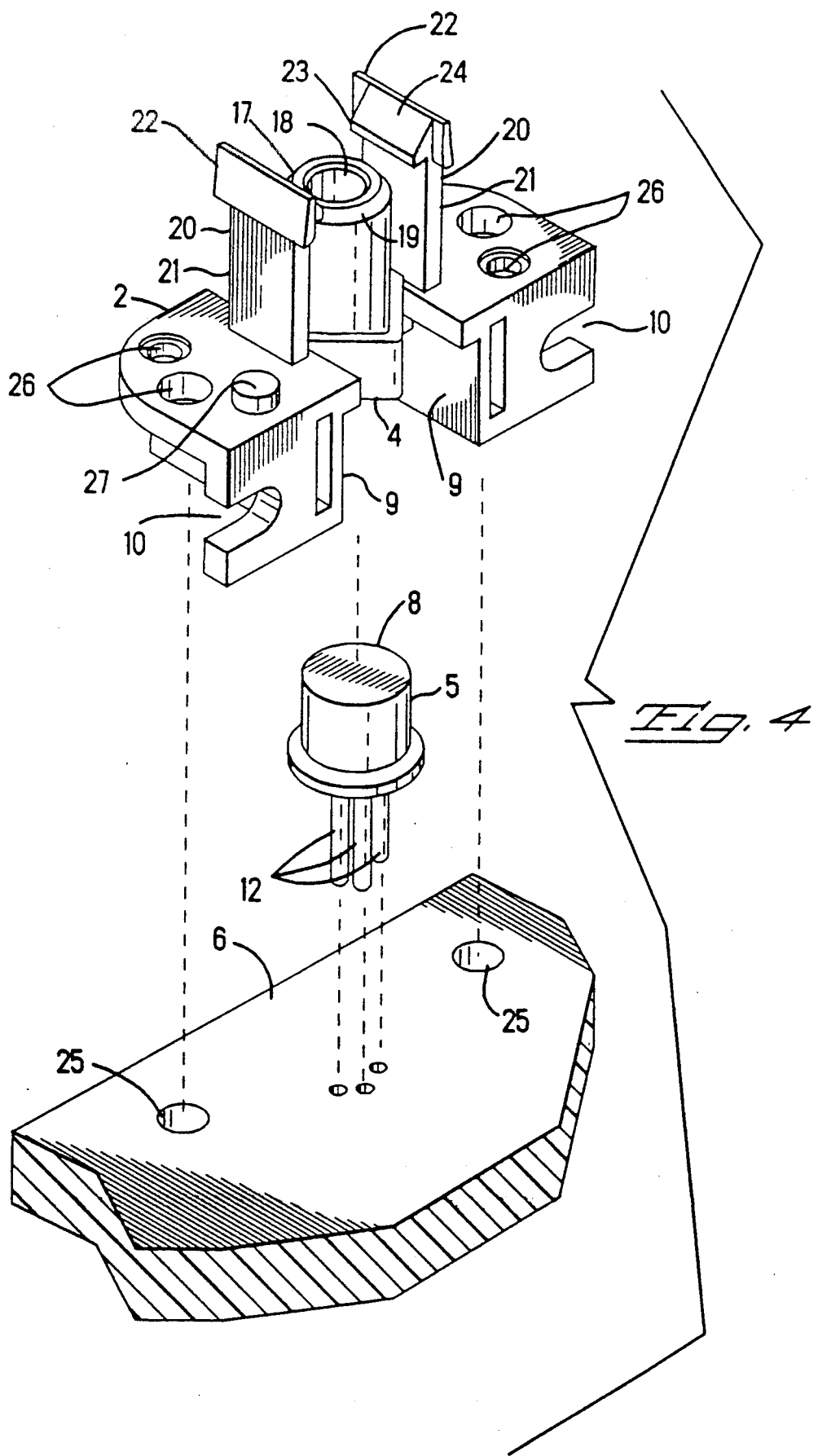
FIG. 4 is a perspective view, partially exploded, of the ADM of the present invention mounted to a PCB with connecting means disposed vertically from the cover.
Figure 6:
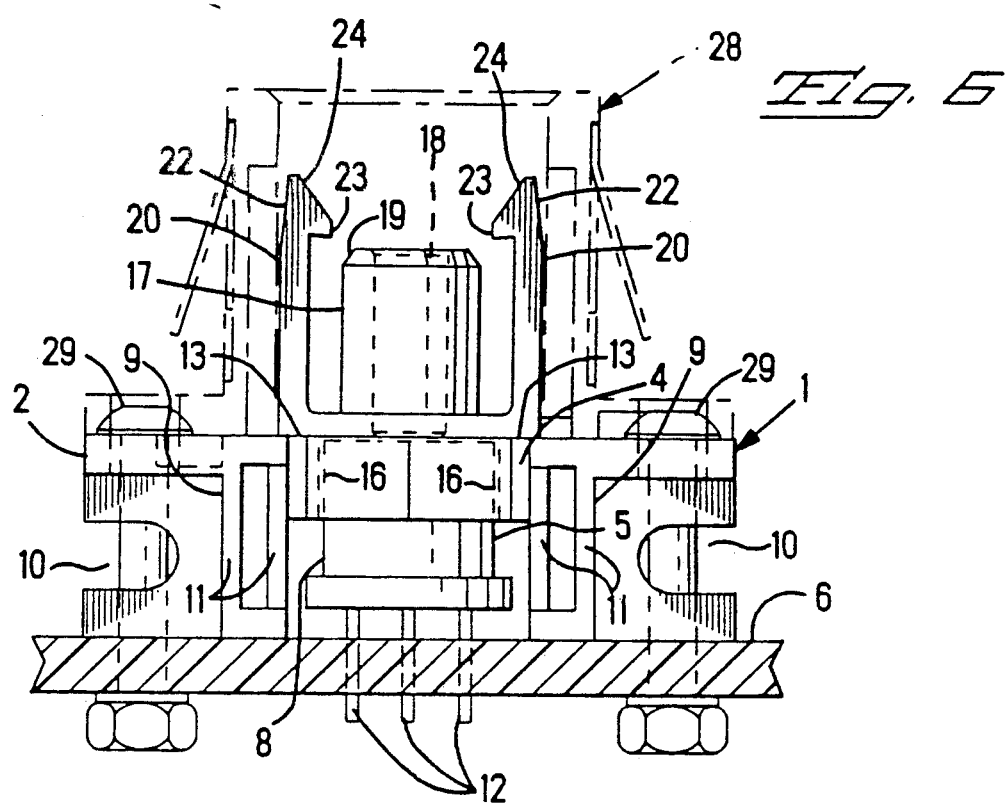
FIG. 6 is the same view as FIG. 5 but further showing a receptacle housing.
Figure 7:
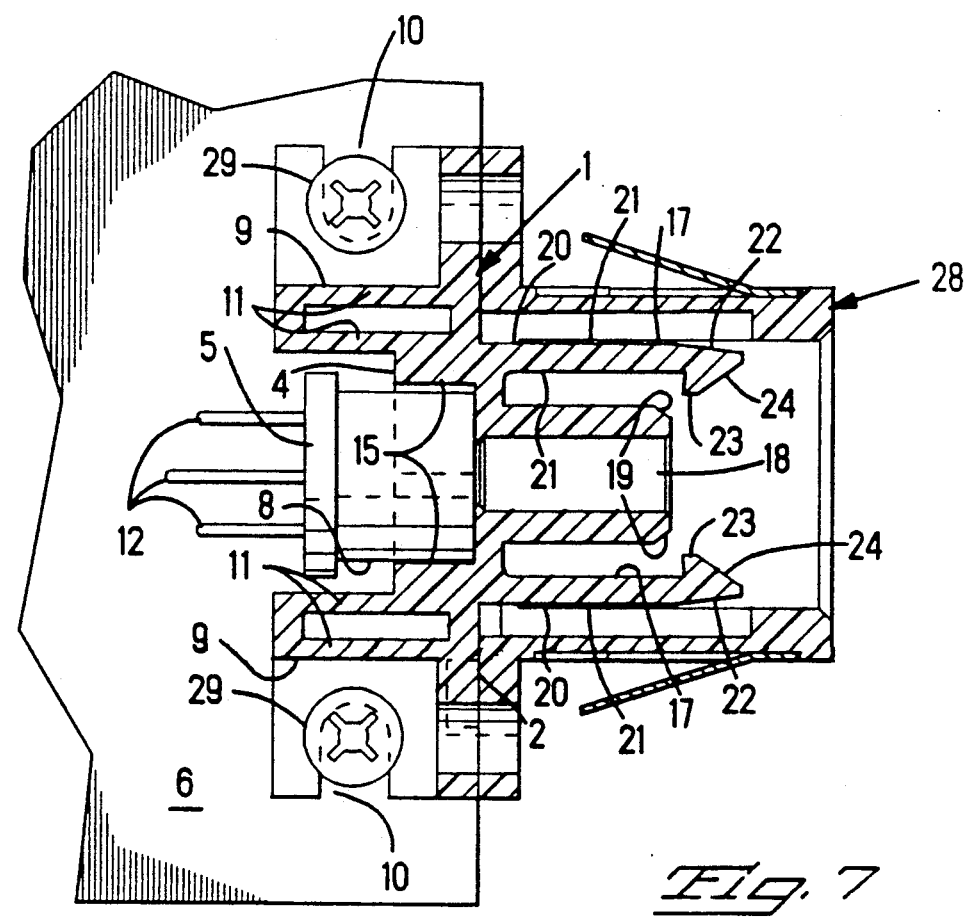
FIG. 7 is the same view as FIG. 2 but further showing a receptacle housing.

Generally shown in all of FIGS. 1, 2, 3, 4, 5, 6 and 7, is an ADM 1 comprising a base 2 having a connecting means 3 for attaching a fiber optic connector. The fiber optic connector described hereinafter is that disclosed by Mulholland et al, U.S. patent application Ser. No. 491,755, filed Mar. 9, 1990. Shown also is securing means 4 for securing an active device 5, and PCB 6, to which the ADM 1 is mounted. Electrical leads 12 of the circuitry project from a rear of the active device 5 for connection to a PCB. The active device 5 has a cylindrical package, called a can 8, enclosing a semi-conductor. In the embodiment shown, the active device 5 is a laser diode. However, within the scope of the present invention is any active device such as any light emitting diode or a photo detector or photo diode or the like.

The base 2 of the ADM 1 has double walled brackets 9 with mounting notches 10. Securing means 4 is supported by braces 13 between the double walls 11 of the bracket 9. Securing means 4 is a resilient, four sided, rhombic-shaped structure 4 extending from rear face of the base. The structure 4 has a rhombic-shaped compartment 14 with four inner walls 15. The can 8 of the active device 5 is encompassed by the compartment 14 and secured therein by press fit at four contact points 15 between the inner surfaces of the walls 15 and the surface of the can 8.

The connecting means 3 of the ADM 1 is for connecting the ADM 1 to a fiber optic connector of the push-pull coupling type. The connecting means 3 of the ADM 1 includes front socket 17 having axial bore 18 and beveled leading end 19. Further included are resilient catch pieces 20. The connecting means 3 may also include an alignment sleeve, not shown. The resilient catch pieces 20 extend from base 2 and are in the form of cantilever arms extending parallel to and on opposing sides of the longitudinal axis of front socket 17. The cantilever-shaped pieces 20 have tab sections 21, protrusions 22, and lip structures 23. In the embodiment shown, a single surface 24 of lip 23 is beveled. However in another embodiment lip 23 would have side bevels to facilitate lead-in to the spacing of the plug housing of a push-pull connector.

The ADM assembly 1 is constructed by inserting the can 8 into the rhombic-shaped compartment 14 of the securing means 4. The resilient rhombus shape deflects and the can 8 is inserted until fully seated within the means 4 with inner surfaces 15 of the sides of the rhombic structure 14 firmly press fit at 4 points around the circumference of the can 8. Leads 12 are inserted through PCB 6 and are soldered to the appropriate circuits of the PCB. The ADM 1, including the active device 5, is secured to the cover by connecting means such as a bolt through the mounting notches 10 and the holes 25 of the PCB cover 6 (See FIG. 5 and 6). Polarizing recesses 26 and nubs 27 (See FIGS. 2, 4 and 5) are provided for oriented attachment to other elements such as a receptacle housing 28 (see FIGS. 6 and 7) for the partial enclosing and protection of the catch pieces 20. The ADM 1 may be mounted to the push-pull connector by the procedure disclosed by Schaffer et al. U.S. patent application Ser. No. 07/541,675, filed Jun. 21, 1990. referenced above.

While what has been described constitutes a presently preferred embodiment or embodiments of the invention, it should be recognized that the ADM 1 may take numerous other forms and may be utilized in other embodiments as well so long as the ADM includes a forward face with a connecting means for attaching an optical fiber connector and a rearward face with securing means for an active device, wherein the connecting means comprises a front socket extending therefrom the active device mount base and having a longitudinal axis and axial bore. Further, so long as the connecting means comprises at least two resilient catch pieces of cantilever form extending from the base parallel to and on opposing sides of the longitudinal axis of the front socket. The resilient catch pieces terminate in protrusions and lip structures. And further so long as the securing means of the active device mount base comprises a resilient, four sided, rhombic-shaped structure extending from the base and encompassing the can of an active device Accordingly, it should be understood that the invention is to be limited only insofar as required by the scope of the following claims.

We claim:

1. An active device mount comprising: a base having a forward face with connecting means for attaching an optical fiber connector, the connector having an alignment ferrule and an optical fiber extending therethrough; and a rearward face with securing means for an active device;

said connecting means comprising: a front socket extending from the base of the active device mount and having a longitudinal axis and an axial bore, and at least two resilient catch pieces of cantilever form extending from the base parallel to, and on opposing sides of, the longitudinal axis of the front socket, the resilient catch pieces terminating in protrusions and lip structures; and said securing means comprising: a resilient, four sided, rhombic-shaped structure extending from the base, encompassing a can of an active device, and securing the can by a press fit at four contact points between four inner surfaces of the four sided rhombic-shaped structure and the surface of the can;

the active device mount further comprising: an optical focusing element encompassed within the axial bore of said socket with a longitudinal axis of the focusing element aligned with a longitudinal axis of the axial bore; and a coupler element aligned with the focusing element and inserted to a precise depth into the socket of the active device mount, and further abutting the alignment ferrule of said fiber optic connector with the optical fiber aligned to the center axis of said coupler element.

2. The active device mount of claim 1 wherein the connecting means further includes an alignment sleeve encompassed by the said front socket with longitudinal axis of said alignment sleeve extending parallel with the longitudinal axis of the socket.

3. The active device mount of claim 2 wherein the alignment sleeve has annular beveled front edge.

4. The active device mount according to claim 1 wherein each said catch piece comprises a tab body terminating in said protrusion and lip structure.

5. The active device mount according to claim 4 wherein each protrusion is wider than each tab body of each catch piece.

6. The active device mount according to claim 1 wherein said base is characterized by at least one nub and one recess for fit to complimentary nub and recess of an attaching element.

7. The active device mount according to claim 1 further comprising, integral with the base of said mount, a shroud partially encompassing said resilient catch pieces.

8. The active device mount of claim 1, 4, 6, or 7 wherein the connectors comprises; an optical fiber plug assembly, the plug assembly including a plug housing with spacing through its body at a surface of a forward section and with defined exterior profile at a rearward section; a connector assembly accommodated by and substantially within the plug housing, the connector assembly having disposed at one exterior surface thereof, ridge and slot and, in conjunction therewith tab; said ridge, slot and tab exposed through the spacing at the surface of the forward section of the plug housing, and ferrule for fixing the optical fiber on a center axis thereof and accommodated within the connector assembly.

9. The active device mount according to claim 8 wherein said lip structures are beveled inwardly to facilitate lead-in to the spacing of said plug housing as said fixture is attached to said optical fiber connector.

* * * * *